United States Patent
Faruque et al.

(10) Patent No.: US 12,496,995 B2
(45) Date of Patent: Dec. 16, 2025

(54) VEHICLE AIRBAG WITH ELASTIC VENT ASSEMBLY

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/632,671

(22) Filed: Apr. 11, 2024

(65) Prior Publication Data

US 2025/0319838 A1  Oct. 16, 2025

(51) Int. Cl.
| | |
|---|---|
| *B60R 21/239* | (2006.01) |
| *B60R 21/203* | (2006.01) |
| *B60R 21/233* | (2006.01) |
| *B60R 21/2338* | (2011.01) |

(52) U.S. Cl.
CPC .......... *B60R 21/239* (2013.01); *B60R 21/203* (2013.01); *B60R 2021/23308* (2013.01); *B60R 2021/23324* (2013.01); *B60R 2021/23386* (2013.01)

(58) Field of Classification Search
CPC . B60R 21/203; B60R 21/233; B60R 21/2334; B60R 21/2338; B60R 21/239; B60R 2021/23308; B60R 2021/23324; B60R 2021/23386; B60R 2021/23388; B60R 2021/2395
See application file for complete search history.

(56) References Cited

U.S. PATENT DOCUMENTS

| | | | | |
|---|---|---|---|---|
| 5,839,755 A * | 11/1998 | Turnbull | ............... | F16K 15/202 |
| | | | | 280/739 |
| 6,439,605 B2 * | 8/2002 | Ariyoshi | ............... | B60R 21/233 |
| | | | | 280/739 |
| 6,554,313 B2 * | 4/2003 | Uchida | ................. | B60R 21/233 |
| | | | | 280/739 |
| 6,863,304 B2 * | 3/2005 | Reiter | .................... | B60R 21/23 |
| | | | | 280/739 |
| 7,172,213 B2 * | 2/2007 | Kreuzer | ............... | B60R 21/239 |
| | | | | 280/739 |
| 7,325,830 B2 * | 2/2008 | Higuchi | .............. | B60R 21/2346 |
| | | | | 280/739 |
| 7,347,450 B2 * | 3/2008 | Williams | .............. | B60R 21/239 |
| | | | | 280/739 |
| 7,568,729 B2 * | 8/2009 | Schnieder | ........... | B60R 21/2338 |
| | | | | 280/739 |
| 7,597,356 B2 * | 10/2009 | Williams | .............. | B60R 21/239 |
| | | | | 280/739 |

(Continued)

FOREIGN PATENT DOCUMENTS

| | | | |
|---|---|---|---|
| KR | 19980030534 Y1 | 8/1998 | |
| KR | 101283088 B1 | 7/2013 | |

*Primary Examiner* — Laura Freedman
(74) *Attorney, Agent, or Firm* — Frank A. MacKenzie; Brooks Kushman P.C.

(57) ABSTRACT

An airbag for a vehicle has a panel defining an inflation chamber inflatable to an inflated position. The airbag includes a tubular vent extending from the panel. The tubular vent is in fluid communication with the inflation chamber. The airbag includes an elastic band extending circumferentially around the tubular vent.

19 Claims, 7 Drawing Sheets

(56) References Cited

U.S. PATENT DOCUMENTS

| | | | |
|---|---|---|---|
| 7,651,130 B2 * | 1/2010 | Bauberger | B60R 21/239 280/743.2 |
| 7,731,231 B2 * | 6/2010 | Schneider | B60R 21/239 280/739 |
| 7,938,445 B2 * | 5/2011 | Smith | B60R 21/239 280/743.2 |
| 8,388,021 B2 | 3/2013 | Mitsuo et al. | |
| 8,419,050 B2 * | 4/2013 | Yoo | B60R 21/239 280/439 |
| 8,573,641 B2 | 11/2013 | Marable et al. | |
| 9,022,423 B2 | 5/2015 | Hosoe et al. | |
| 9,533,652 B1 | 1/2017 | Paxton et al. | |
| 9,580,039 B2 | 2/2017 | Schneider et al. | |
| 9,845,067 B2 * | 12/2017 | Morris | B60R 21/233 |
| 9,845,069 B1 * | 12/2017 | Owen | B60R 21/205 |
| 10,793,098 B2 * | 10/2020 | Malapati | B60R 21/205 |
| 11,667,260 B2 * | 6/2023 | Jang | B60R 21/239 280/739 |
| 2019/0039557 A1 | 2/2019 | Barnes et al. | |
| 2022/0306038 A1 | 9/2022 | Perez | |

* cited by examiner

VEHICLE AIRBAG WITH ELASTIC VENT ASSEMBLY

BACKGROUND

A vehicle may include one or more airbags deployable during certain vehicle impacts to control kinematics of occupants inside the vehicle. The airbag may be a component of an airbag assembly including a housing supporting the airbag, and an inflator in communication with the airbag for inflating the airbag from an uninflated position to an inflated position.

DETAILED DESCRIPTION

A vehicle airbag assembly includes an airbag having a panel defining an inflation chamber inflatable to an inflated position. The airbag includes a tubular vent extending from the panel. The tubular vent is in fluid communication with the inflation chamber. The airbag includes an elastic band extending circumferentially around the tubular vent.

The elastic band may be elastically deformable relative to the tubular vent.

The tubular vent may be fabric and the elastic band may be an elastomer.

The elastic band may be designed to expand when pressure in the inflation chamber exceeds a threshold pressure.

The tubular vent may extend from the panel external to the inflation chamber and the elastic band may be external to the inflation chamber.

The tubular vent may be open to atmosphere.

The tubular vent may be supported by the panel.

The tubular vent may include a passageway extending from the inflation chamber to atmosphere. The elastic band may constrict the diameter of the passageway.

The vehicle airbag assembly may include an inflator, the inflation chamber being inflatable by the inflator to the inflated position.

The elastic band may be sewn to the tubular vent.

The elastic band may extend endlessly around the tubular vent.

The airbag may include a partition separating the airbag into a base segment and an outer segment. The airbag may include a one-way vent on the partition configured to allow fluid flow from the base segment to the outer segment and to prevent fluid flow from the outer segment to the base segment. The outer segment may be supported on the base segment and the tubular vent may be on the outer segment. The inflator may inflate the outer segment through the base segment.

A vehicle includes a steering wheel, a front pillar adjacent to the steering wheel, and an airbag supported by the steering wheel. The airbag has a panel defining an inflation chamber inflatable to an inflated position. The airbag includes a tubular vent extending from the panel, the tubular vent being in fluid communication with the inflation chamber. The airbag includes an elastic band extending circumferentially around the tubular vent.

The airbag may include a second tubular vent extending from the panel spaced from the tubular vent. The second tubular vent may be in fluid communication with the inflation chamber. The second tubular vent may be inboard of the tubular vent. A second elastic band may extend circumferentially around the second tubular vent.

The elastic band may be designed to expand when pressure in the inflation chamber exceeds a threshold pressure. The second tubular vent may be designed to have a higher discharge rate than the tubular vent at pressures in the inflation chamber above a pressure threshold.

The elastic band may be stiffer than the second elastic band.

Figure 1:
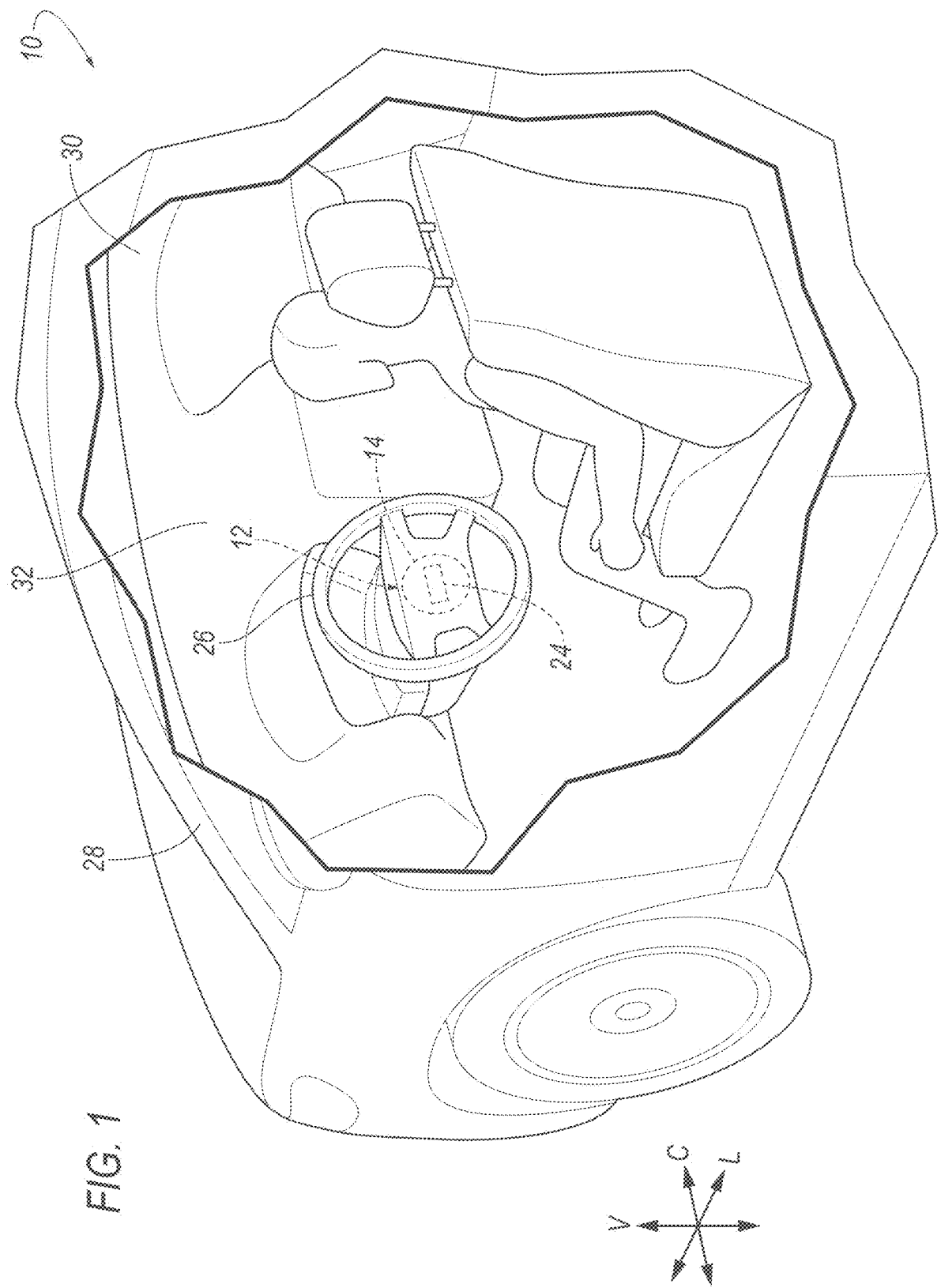
FIG. 1 is a perspective view of a vehicle cut-away to show an interior.
Figure 2:
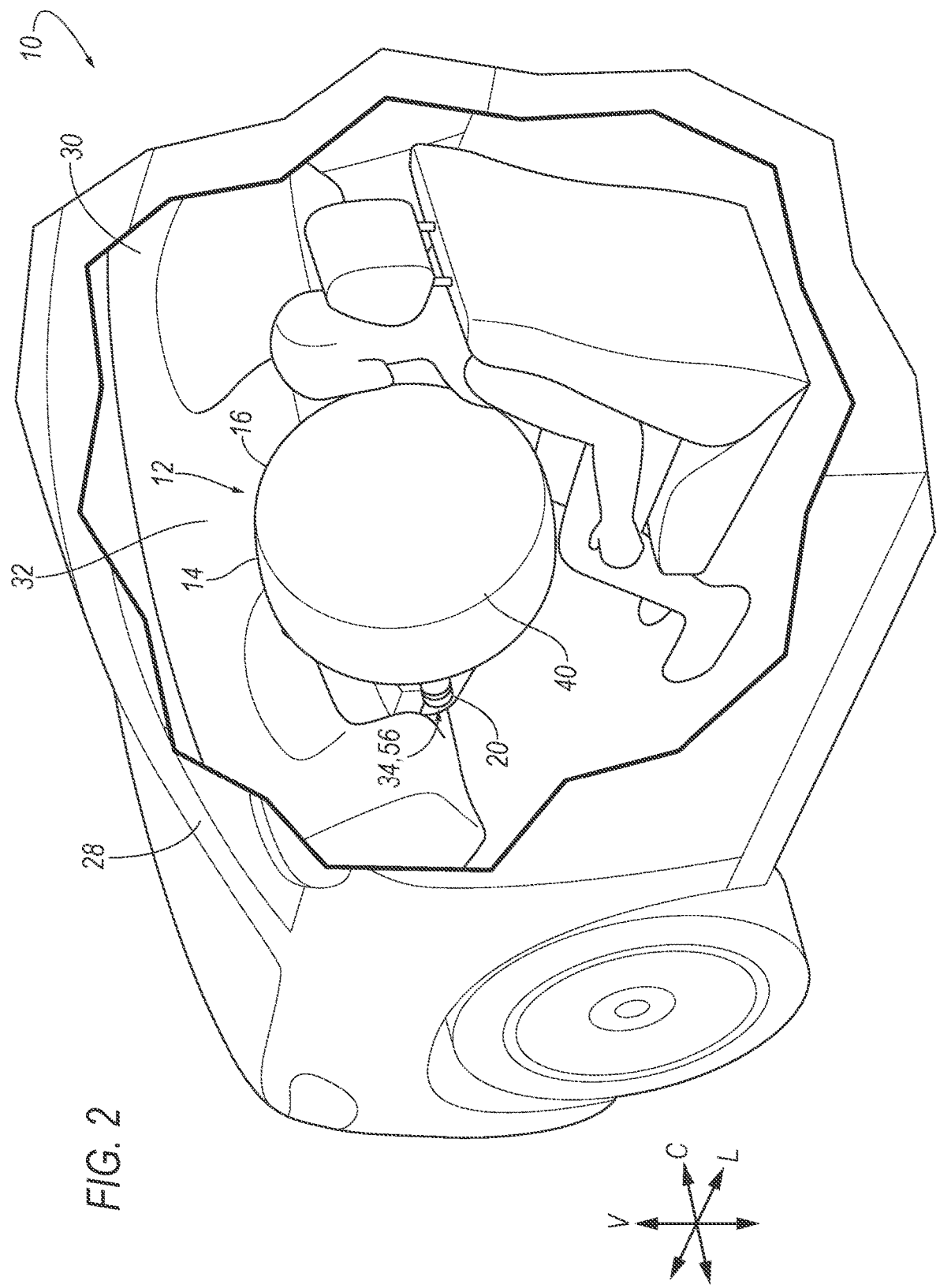
FIG. 2 is a perspective view of the vehicle with an airbag in an inflated position.

With reference to the Figures, wherein like numerals indicate like parts throughout the several views, a vehicle 10 includes an airbag assembly 12 including an airbag 14 having a panel 16 defining an inflation chamber 18 inflatable from an uninflated position (FIG. 1) to an inflated position (FIG. 2). The airbag 14 includes a tubular vent 20 extending from the panel 16. The tubular vent 20 is in fluid communication with the inflation chamber 18. The airbag 14 includes an elastic band 22 extending circumferentially around the tubular vent 20.

In some circumstances, the tubular vent 20 can vent fluid, e.g., inflation medium from an inflator 24, from the inflation chamber 18 to maintain and/or lower pressure in the inflation chamber 18. The elastic band 22 controls the fluid flow through the tubular vent 20. The elastic band 22 constricts the tubular vent 20, and the elastic band 22 is expandable to increase flowrate through the tubular vent 20. The elastic band 22 expands and contracts based on pressure in the inflation chamber 18. Specifically, during inflation of the airbag 14 by the inflator 24, the elastic band 22 expands in the event that pressure in the inflation chamber 18 exceeds a threshold pressure, as described below. In such an event, the amount of expansion of the elastic band 22 is based on the pressure in the inflation chamber 18. In other words, the amount of expansion is variable based on pressure. The elastic band 22 continues to expand as pressure in the inflation chamber 18 increases above the threshold pressure, and the elastic band 22 contracts as pressure in the inflation chamber 18 decreases toward the threshold pressure.

In some examples, as described further below, the venting of the airbag 14 is designed so that the venting has a discharge rate that is lower at one region of the airbag 14 to affect positioning of the airbag 14 in the inflated position and movement of the airbag 14 when impacted. In some examples, the airbag assembly 12 is mounted to a steering wheel 26 of the vehicle 10, and in such examples, the airbag 14 is designed so that venting has a discharge rate this is lower at a region of the airbag 14 near an adjacent to a pillar 28 of the vehicle body. In such an example, the lower discharge rate at the region of the airbag 14 near the adjacent one of the pillars 28 can position the airbag 14 to decrease the likelihood of occupant impact with the adjacent one of the pillars 28.

With reference to FIG. 1, the vehicle 10 may be any suitable type of automobile, e.g., a passenger or commercial automobile such as a sedan, a coupe, a truck, a sport utility, a crossover, a van, a minivan, a taxi, a bus, etc.

The vehicle 10 includes a vehicle body. The vehicle body may be of a unibody construction, a body-on-frame construction, or any suitable construction. In the unibody construction, the vehicle body serves as a frame, and the vehicle body (includes the rockers, pillars 28, roof rails, etc.) is unitary, i.e., a continuous one-piece unit. As another example, in body-on-frame construction (also referred to as a cab-on-frame construction), the vehicle body and frame are separate components, i.e., are modular, and the vehicle body is supported on and affixed to the frame. In other examples, the vehicle body may have any suitable construction. The vehicle body may be of any suitable material, for example, steel, aluminum, etc.

The vehicle body includes a vehicle roof, pillars 28, body panels, a vehicle floor, etc. The vehicle body defines a passenger compartment 30 to house occupants of the vehicle 10. The passenger compartment 30 may extend across the vehicle 10, i.e., from one side to the other side of the vehicle 10. The passenger compartment 30 includes a front end and a rear end with the front end being in front of the rear end during forward movement of the vehicle 10.

With reference to FIG. 1, the vehicle 10 defines a vehicle-longitudinal axis L extending between a front end (not numbered) and a rear-end (not numbered) of the vehicle 10. The vehicle 10 defines a cross-vehicle axis C extending cross-vehicle from one side to the other side of the vehicle 10. The vehicle 10 defines a vertical axis V extending through a floor of the vehicle 10 and a roof of the vehicle 10. The vehicle-longitudinal axis L, the cross-vehicle axis C, and the vertical axis V are perpendicular relative to each other.

The vehicle roof and the vehicle floor are spaced from each other. Specifically, the vehicle floor is spaced below the vehicle roof. The vehicle roof defines the upper boundary of the passenger compartment 30 and may extend from the front end of the passenger compartment 30 to the rear end of the passenger compartment 30. The vehicle roof may include roof rails and a roof panel extending from one roof rail to the other roof rail. The roof panel may be irremovably fixed to the roof rails. In other words, the roof panel is secured to the roof rails in such a way that removal requires destruction such as cutting, e.g., cutting material and/or welded joints, etc. As an example, the roof panel may be attached to both roof rails, e.g., by welding, fasteners, etc.

The vehicle floor defines the lower boundary of the passenger compartment 30 and may extend from the front end of the passenger compartment 30 to the rear end of the passenger compartment 30. The vehicle floor may include upholstery, for example, carpet, and may have a class-A surface facing the passenger compartment 30, i.e., a surface specifically manufactured to have a high quality, finished, aesthetic appearance free of blemishes.

The vehicle body includes a body side. Specifically, the vehicle body includes two body sides spaced cross vehicle from each other. The body side is a side of the body located vehicle-outboard of the passenger compartment 30. The body sides may be spaced from each other along the cross-vehicle axis A on opposite sides of the longitudinal axis L and may be elongated along the longitudinal axis L. The body side includes one or more door openings. The vehicle floor extends from one body side to the other body side and the vehicle roof extends from one body side to the other body side.

The vehicle body, specifically each body side, may include pillars 28. In some examples, the pillars 28 on the same side of the vehicle 10 are separated by one of the door openings. For example, the vehicle body may include a front pillar on each side of the vehicle 10. The front pillar may extend between a windshield and a front door opening, and other pillars may be vehicle-rearward of the front pillars, e.g., between adjacent doors. The vehicle 10 may include any suitable number of pillars 28 on either body side. The pillars 28 may extend from the vehicle roof to the vehicle floor.

With reference to FIG. 1, the vehicle 10 includes vehicle doors, openable for occupants to enter and exit a passenger compartment 30. In the example shown in the Figures, the vehicle 10 includes a front door and a rear door on each body side. The front door is vehicle-forward of the rear door along the longitudinal axis L of the vehicle 10.

The vehicle 10 may include one or more vehicle seats. Specifically, the vehicle 10 may include any suitable number of vehicle seats. The vehicle seats are supported by the vehicle floor. The vehicle seats may be arranged in any suitable arrangement in the passenger compartment 30. One or more of the vehicle seats may be at the front end of the passenger compartment 30, e.g., front seats. The front seats may include a driver seat and a passenger seat. The driver seat is in position to position the occupant for operation of the steering wheel 26, e.g., at a front, left position of the passenger compartment 30 in some examples. One or more of the vehicle seats may be behind the front end of the passenger compartment 30, e.g., at the rear end of the passenger compartment 30 as a rear row. The vehicle seats may be of any suitable type, e.g., a bucket seat, bench seat, etc. The vehicle seats may include seatbelts.

Figure 3:
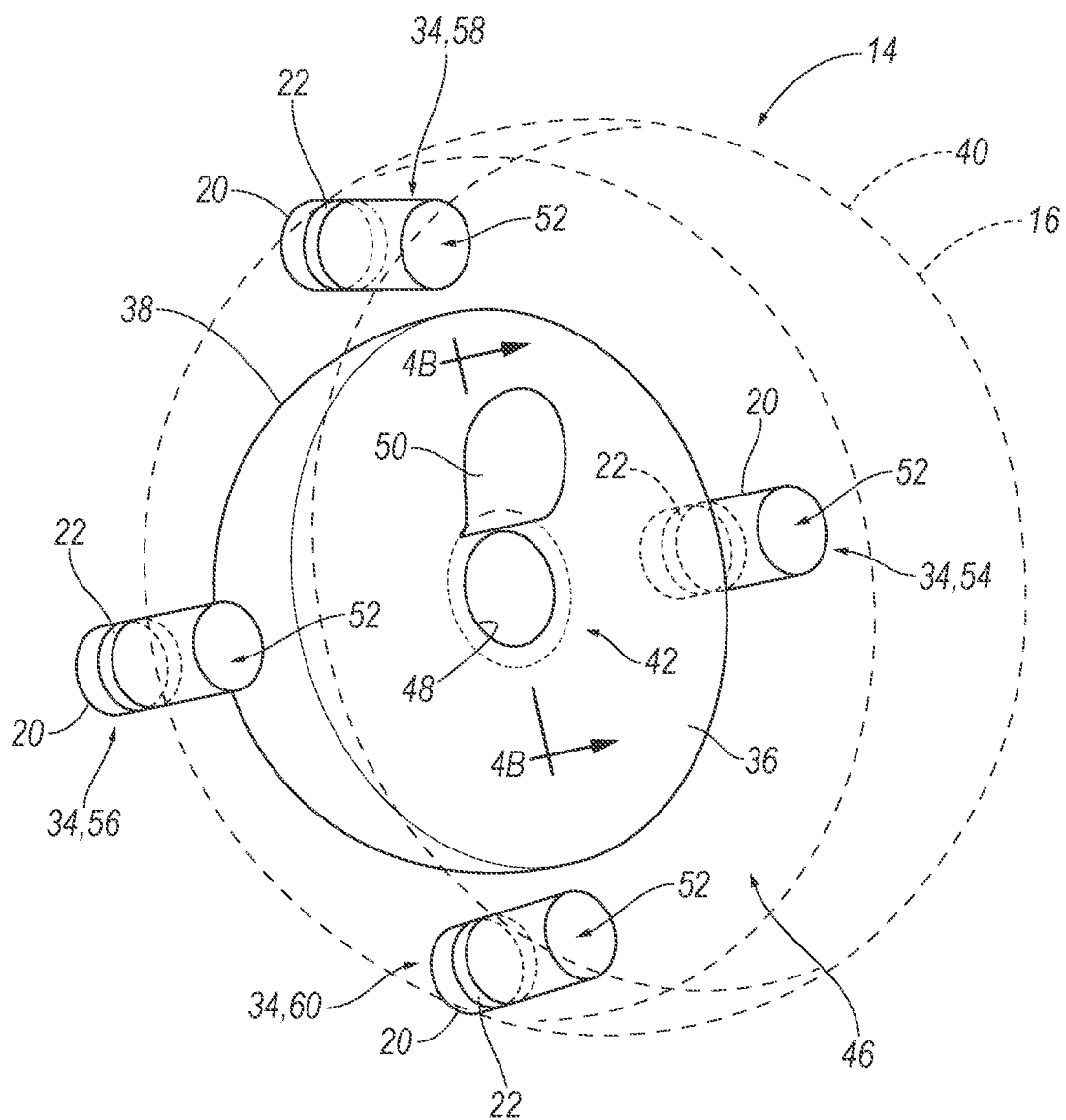
FIG. 3 is a perspective view of the airbag with a base segment shown in solid lines and an outer segment shown in broken lines to show a partition and a one-way vent between the base segment and the outer segment.

With reference to FIGS. 1-3, the vehicle 10 includes at least one dash 32. In the example shown in the Figures, the dash 32 is at the front end of the passenger compartment 30 and extends from one side of the vehicle 10 to the other side of the vehicle 10. As an example, the dash 32 may extend from one front pillar 28 to another front pillar 28. The dash 32 may extend downwardly from the windshield. The dash 32 may also be called a bulkhead or an instrument panel 16. The dash 32 may support vehicle 10 controls, including the steering wheel 26. As other examples, the dash 32 may include and/or support vehicle 10 controls, such as gauges, dials, screens, and information displays; heating and ventilation equipment; a radio and other electronics; etc.

The vehicle 10 includes a steering system that controls the turning of wheels of the vehicle 10 on the ground. The steering system includes the steering wheel 26. Components of the steering system are in communication with and receive input from the steering wheel 26. The steering system may include a rack-and-pinion system with electric power-assisted steering, a steer-by-wire system, or any other suitable system, and in some examples, are of the type known in the art.

The steering system of the vehicle 10 includes a steering column and the steering wheel 26 may be supported by the steering column. The steering wheel 26 is in the passenger cabin and the steering column is at least partly in the passenger cabin. The steering wheel 26 receives rotational input from a human driver, i.e., a human driver seated in the driver seat, and the steering column transmits the rotation through other components of the steering system to the wheels of the vehicle 10. The airbag 14 may be supported by the steering wheel 26, as shown in the example in the Figures.

The steering column is adjacent to the dash 32 and may be supported by the dash 32. The steering column may include at least one steering shaft that is fixed to the steering wheel 26 to transmit rotation of the steering wheel 26. The steering column includes a shroud that surrounds the steering shaft. The shroud has a class-A surface facing the passenger cabin, i.e., a finished surface exposed to view by a customer and free of unaesthetic blemishes and defects.

The steering column may be adjustable. For example, the tilt and the for-aft location of the steering column may be adjusted by the huma driver. The adjustment may be manual, e.g., with the use of a lever, or may be automated, e.g., with the use of motors controlled by a human-machine interface, either of which in some examples may be of a known type.

The steering wheel 26 is adjacent to one of the front pillars 28 (specifically, the front pillar labeled 28 in the example of FIGS. 1-2). In other words, the front pillar 28 adjacent to the steering wheel 26 is the one of the front pillars 28 that is nearest the steering wheel 26. In such examples, the front pillar 28 is vehicle-forward of and outboard of the steering wheel 26, in which "outboard" is a cross-vehicle direction that does not cross the longitudinal centerline of the vehicle 10.

The airbag assembly 12, including the airbag 14, may be supported by the steering wheel 26 in the uninflated position. In other words, the weight of the airbag assembly 12 is borne by the steering wheel 26 in the uninflated position. The airbag 14 may be inflatable from the steering wheel 26 toward the front pillar 28 that is adjacent to the steering wheel 26, and in some examples, may contact the front pillar 28 that is adjacent to the steering wheel 26 in the inflated position.

The airbag assembly 12 includes the airbag 14 and the inflator 24 and may include a housing (not numbered). The inflator 24 inflates the airbag 14 to the inflated position, as described further below. In examples including the housing, the housing houses the airbag 14 in the uninflated position and supports the airbag 14 in the inflated position. The airbag 14 may be rolled and/or folded to fit within the housing in the uninflated position. The housing may be of any suitable material, e.g., a rigid polymer, a metal, a composite, or a combination of rigid materials. In examples in which the airbag 14 is assembly is supported by the steering wheel 26, the airbag 14 housing may be attached to the steering wheel 26. The airbag 14 housing may, for example, include clips, threaded fasteners, etc., for attaching the housing to the steering wheel 26.

The inflator 24 is in fluid communication with the airbag 14. The inflation chamber 18 is inflatable by the inflator 24 to the inflated position. The inflator 24 expands the airbag 14 with inflation medium, such as a gas, to move the airbag 14 from the uninflated position to the inflated position. The inflator 24 may be supported by any suitable component. For example, the inflator 24 may be supported by the housing. The inflator 24 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 24 may be, for example, at least partially in the inflation chamber 18 to deliver inflation medium directly to the inflation chamber 18 or may be connected to the inflation chamber 18 through fill tubes, diffusers, etc.

The airbag 14 includes the panel 16 and a vent assembly 34. The vent assembly 34 includes the tubular vent 20 and the elastic band 22. In some examples, the airbag 14 includes more than one vent assembly 34. For example, the example shown in the includes four vent assemblies 34. While some characteristics of the vent assembly 34 may vary between the different vent assemblies 34, as described below, common numerals are used to identify common features in the example airbag 14 in the Figures that includes multiple vent assemblies 34. The numerical adjectives "first," "second," etc., are used herein, including with reference to the vent assemblies 34, as identifiers and do not signify importance or order.

The panel 16 defines the inflation chamber 18. The inflation chamber 18 is a void surrounded by the panel 16. The inflator 24 provides inflation medium to the inflation chamber 18 to pressurize the inflation chamber 18 and expand the panel 16 during inflation.

The panel 16 may be unitary, i.e., a single, uniform piece of material with no seams, joints, fasteners, or adhesives holding it together. In other examples, the panel 16 may include multiple segments formed separately and subsequently attached together at seams by, for example, stitching, welding, adhesive, etc.

In some examples, the panel 16 and one or more of the tubular vents 20 may be unitary, i.e., a single, uniform piece of material with no seams, joints, fasteners, or adhesives holding them together. As an example, the panel 16 and the tubular vents 20 may be formed with a one-piece woven process. In other examples, the panel 16 and the tubular vents 20 may be non-unitary components. In such examples, the panel 16 and tubular vents 20 are formed separately and subsequently assembled, e.g., by stitching, welding, adhesive, etc.

In some examples, the panel 16 and the tubular vents 20 may be the same type of material and/or may have the same construction. As an example, the panel 16 and the tubular vents 20 may be fabric of the same material type. In such examples, the yarn and/or weave of the fabric may be identical for the panel 16 and the tubular vents 20. The panel 16 and/or the tubular vents 20 may be a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

With reference to FIG. 3, the airbag 14 may include a partition 36 separating the airbag 14 into a base segment 38 and an outer segment 40. A one-way vent 42 may be on the partition 36, as described below. The panel 16 may define both the base segment 38 and the outer segment 40 and the partition 36 may be connected to the panel 16 across the inflation chamber 18 to separate the airbag 14 into the base segment 38 and the outer segment 40. The partition 36 may completely separate the base segment 38 from the outer segment 40 when the one-way vent 42 is in a closed position. In such an example, the partition 36 divides the inflation chamber 18 into a first inflation chamber 44 in the base segment 38 and a second inflation chamber 46 in the outer segment 40, and the partition 36 fluidly isolates the second inflation chamber 46 from the first inflation chamber 44 when the one-way vent 42 is closed. The partition 36 may be the same type of material as the panel 16. In some examples, the partition 36 is fabric. The material and construction of the partition 36 prevents fluid flow through the material of the partition 36, e.g., to prevent fluid flow between warps and wefts of woven yarns of the partition 36.

In examples including the partition 36, the outer segment 40 is at least partially supported by the base segment 38 in the inflated position, i.e., at least a portion of the weight of the outer segment 40 is borne by the base segment 38. The base segment 38 connects the outer segment 40 to the steering wheel 26 in the example shown in the Figures. The inflator 24 inflates the outer segment 40 through the base segment 38. In other words, during inflation, the inflator 24 provides inflation medium to the base segment 38 and the outer segment 40 is inflated by inflation medium that flows through the base segment 38 to the outer segment 40. In the example shown in the Figures, the inflation medium flows from the base segment 38 to the outer segment 40 through the one-way valve. Specifically, in the example shown in the Figures, the only inflation medium from the inflator 24 that inflates the outer segment 40 is inflation medium that flows through the one-way valve from the base segment 38 to the outer segment 40.

Figures 4A, 4B:
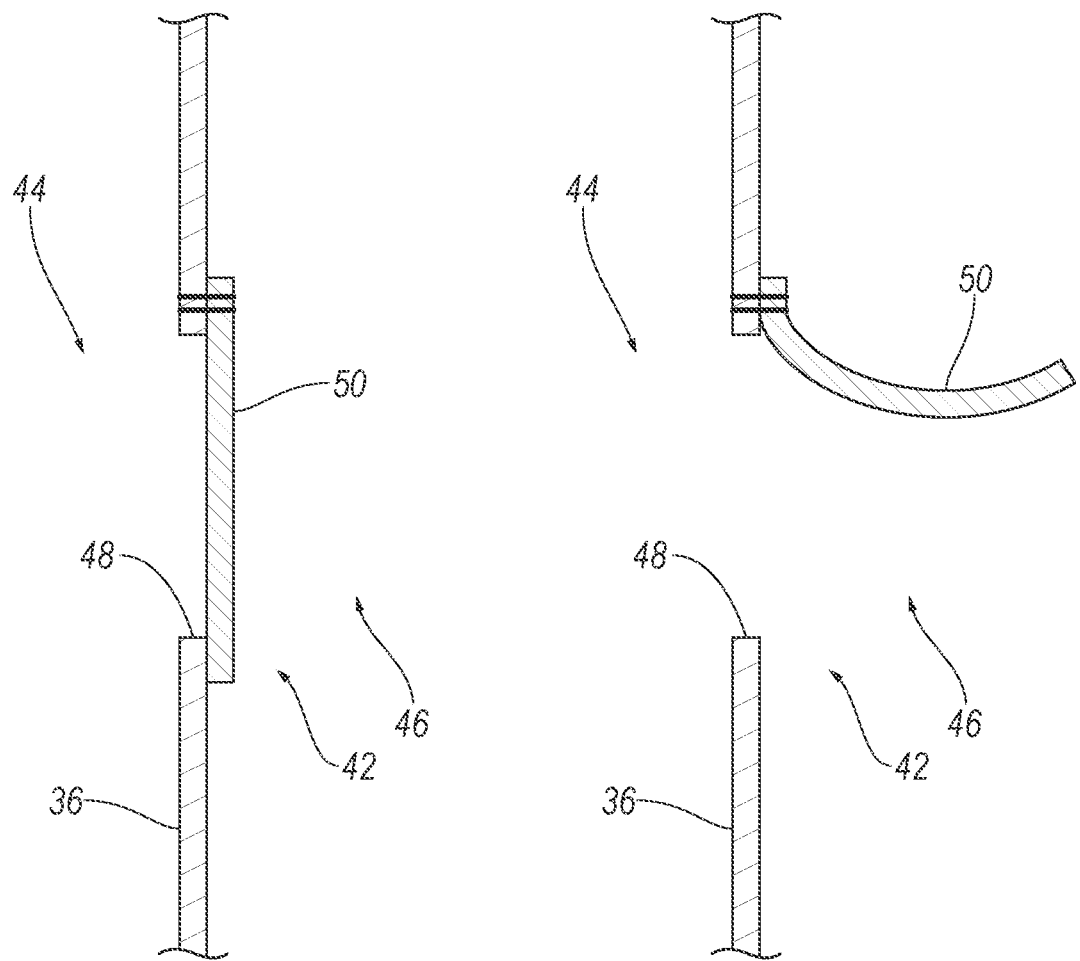
FIG. 4A is a cross-section of the partition and one-way vent when the one-way vent is closed.
FIG. 4B is a cross-section of the partition and one-way vent when the one-way vent is open.

With reference to FIGS. 3-4B, the one-way vent 42 is on the partition 36. The one-way vent 42 selectively provides fluid communication between the first inflation chamber 44 and the second inflation chamber 46. The one-way vent 42 is configured to allow fluid flow from the base segment 38 to the outer segment 40 and to prevent fluid flow from the outer segment 40 to the base segment 38. As one example, FIGS. 3-4B show the one-way vent 42 as including a hole 48 through the partition 36 and a flap 50 on the partition 36 in the second inflation chamber 46. The flap 50 is designed to separate from the partition 36 to allow fluid flow from the base segment 38 to the outer segment 40 when pressure is higher in the first inflation chamber 44 relative to the second inflation chamber 46. The flap 50 is designed to abut the partition 36 and seal against the partition 36 to prevent fluid flow from the outer segment 40 to the base segment 38 when pressure is higher in the second inflation chamber 46 relative to the first inflation chamber 44. In the event of a positive pressure difference between the first inflation chamber 44 and the second inflation chamber 46, i.e., during inflation of the first inflation chamber 44 by the inflator 24, the flap 50 is opened (FIG. 4B) by the force of the fluid and fluid flows from the first inflation chamber 44 to the second inflation chamber 46 through the hole 48. In the event of a positive pressure difference between the second inflation chamber 46 and the first inflation chamber 44, the flap 50 is closed (FIG. 4A) by the force of the fluid and prevents fluid flow through the hole 48. The flap 50 and/or a seat on the partition 36 that the flap 50 abuts in the closed position, can be of any suitable design, i.e., size, shape, material type, rigidity, etc., to ensure a seal between the flap 50 and the partition 36 to prevent fluid flow through the hole 48 when the one-way vent 42 is in the closed position.

With reference to FIGS. 5A-6B, the tubular vent 20 extends from the panel 16. The tubular vent 20 is supported by the panel 16 in the inflated position and the uninflated position, i.e., the weight of the tubular vent 20 is borne by the panel 16. In the example shown in the Figures, the tubular vent 20 extends from the outer segment 40 of the airbag 14 and thus selectively vents the second inflation chamber 46 to atmosphere. As an example, in some instances in which the outer segment 40 of the airbag 14 is impacted, the pressure in the second inflation chamber 46 may increase to exceed the pressure of the first inflation chamber 44, thus closing the one-way vent 42. In the event the pressure in the second inflation chamber 46 exceeds the threshold pressure of the vent assembly 34, the elastic band 22 is expanded to change the venting of the second inflation chamber 46.

The tubular vent 20 extends from the panel 16 external to the inflation chamber 18. In the example shown in the Figures, the tubular vent 20 extends from the panel 16 into the atmosphere around the panel 16, specifically the passenger compartment 30. The tubular vent 20 is in fluid communication with the inflation chamber 18. The tubular vent 20 includes a passageway 52 extending from the inflation chamber 18 to atmosphere. In some examples, the passageway 52 may be closed, completely preventing fluid flow therethrough, when pressure in the second inflation chamber 46 is below the threshold pressure. When the passageway 52 is open, the tubular vent 20 is open to atmosphere. In such an example, the passageway 52 allows fluid flow through the tubular vent 20 from the second inflation chamber 46 to the atmosphere to vent the second inflation chamber 46. This relieves the pressure in the second inflation chamber 46 and may locally reduce pressure in a region of the airbag 14 to position the airbag 14.

Figure 6A:
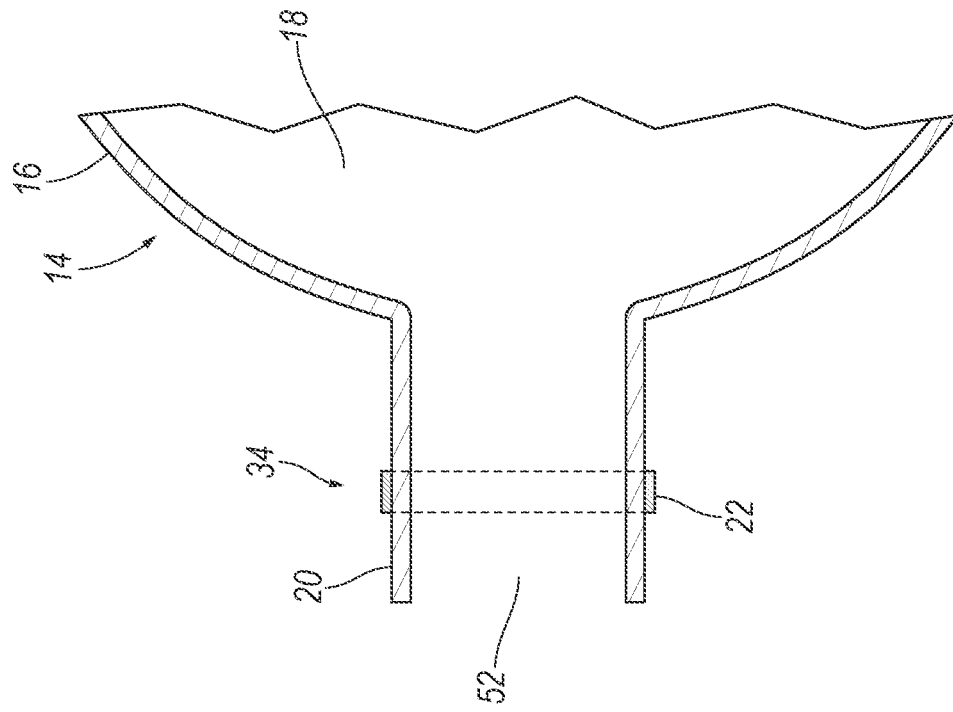
FIG. 6A is a cross-section of FIG. 5A.

The elastic band 22 extends circumferentially around the tubular vent 20 to constrict the passageway 52 and control the amount of venting through the vent assembly 34. The tubular vent 20 extends from the panel 16 external to the inflation chamber 18, as set forth above, and the elastic band 22 is external to the inflation chamber 18. In the example shown in the, the elastic band 22 is on the tubular vent 20 spaced from the panel 16. In such an example, a portion of the tubular vent 20 extends from the panel 16 to the elastic band 22, as shown in FIGS. 6A-6B.

Figure 5A:
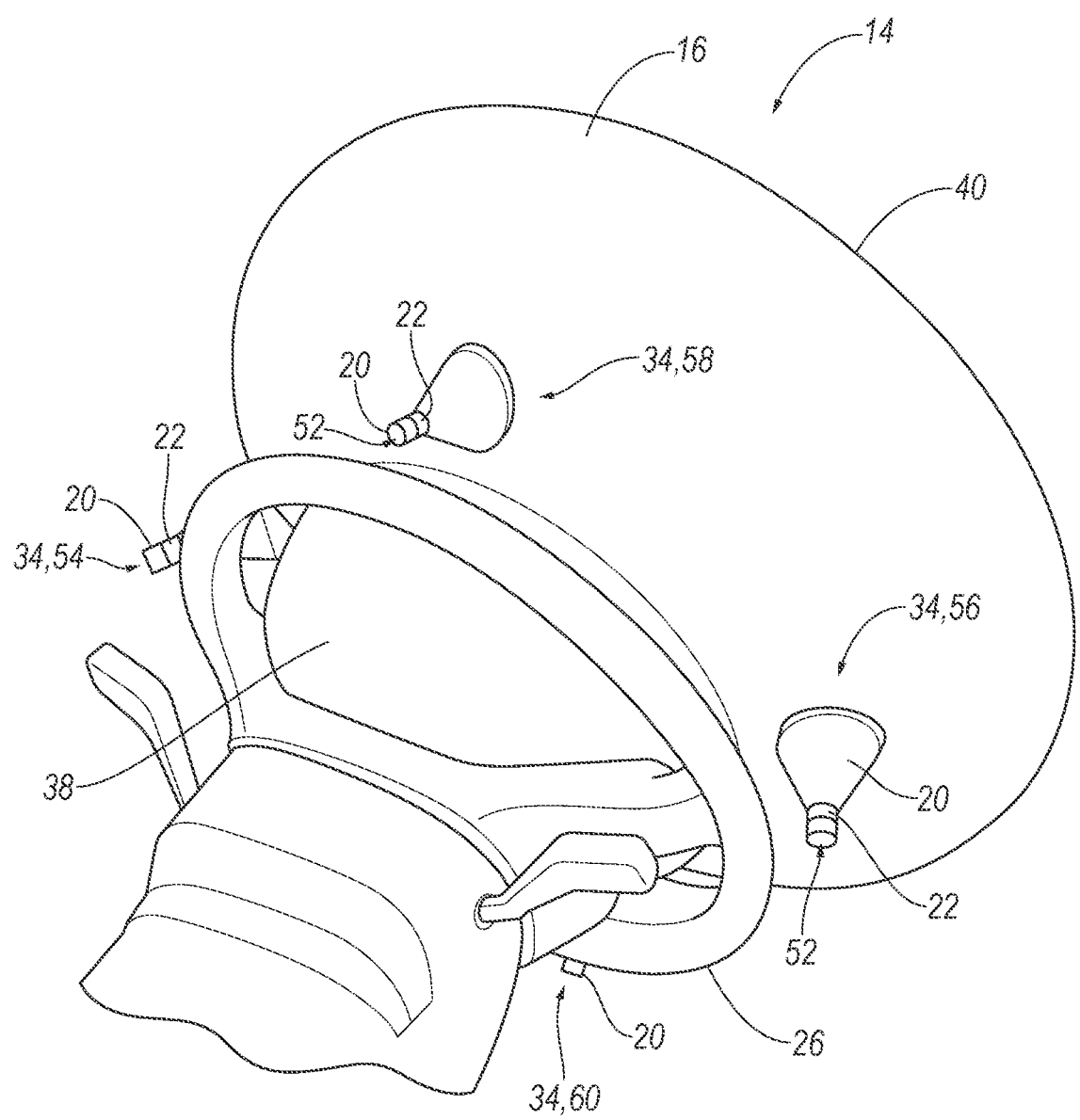
FIG. 5A is a perspective view of the airbag in an inflated position.
Figure 5B:
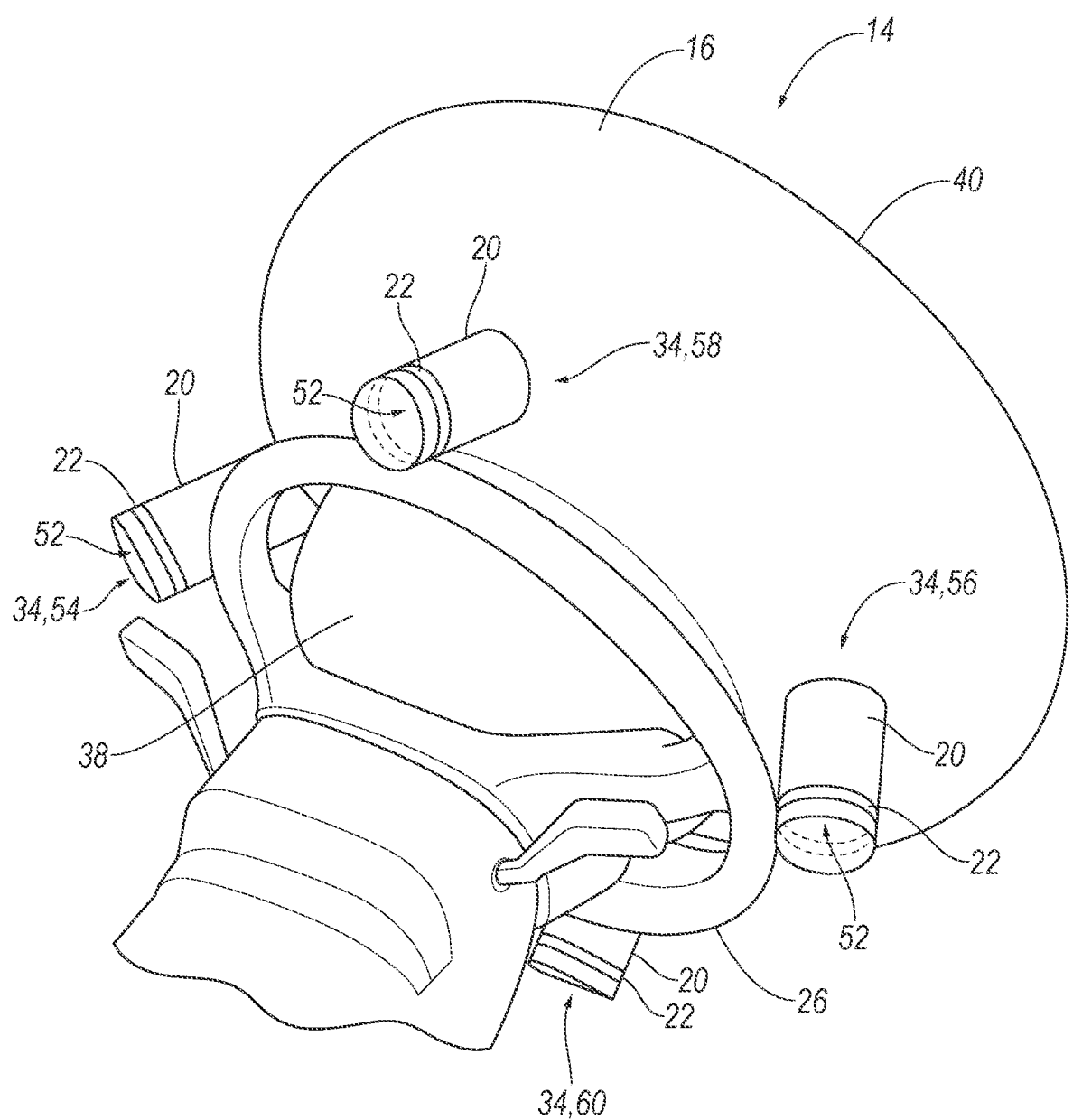
FIG. 5B is a perspective view of the airbag in an inflated position at a higher inflation pressure than FIG. 5A.
Figure 6B:
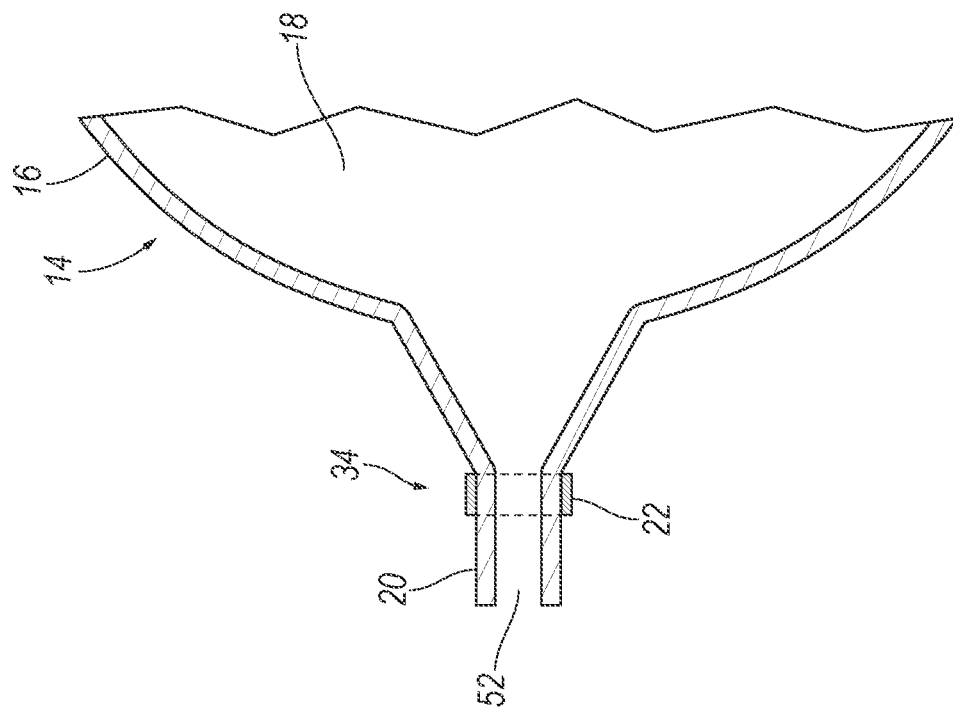
FIG. 6B is a cross-section of FIG. 5B.

In the example shown in the Figures, the tubular vent 20 has a cylindrical shape at full exhaust, shown in FIGS. 5B and 6B. In other examples, the tubular vent 20 may have any suitable shape. In some examples, the cross-sectional size of the passageway 52 of the tubular vent 20 may taper in a direction away from the panel 16.

The elastic band 22 extends circumferentially around the tubular vent 20. In the example shown in the Figures, the elastic band 22 extends endlessly around the tubular vent 20. For example, in the example shown in the Figures, the elastic band 22 is a cylindrical ring. In other examples, the elastic band 22 may have any suitable shape.

The elastic band 22 is fixed relative to the tubular vent 20. As examples, the elastic band 22 may sewn to the tubular vent 20, adhered to the tubular vent 20, welded to the tubular vent 20, etc. In the alternative or in addition, tubular vent 20 may include two opposing fabric panels and the elastic band 22 may be retained between the two opposing fabric panels.

In the example shown in FIGS. 6A-6B, the vent assembly 34 is designed to allow fluid flow from the second inflation chamber 46 to atmosphere when the pressure in the second inflation chamber 46 is lower than the threshold pressure to expand the elastic band 22. In such an example, the vent assembly 34 vents the second inflation chamber 46 to atmosphere at any pressure of the second inflation chamber 46 that exceeds the pressure of the atmosphere exterior to the airbag 14. In other examples, the vent assembly 34 may be designed to be closed, i.e. the passageway 52 is closed and does not allow fluid flow therethrough, until the threshold pressure to expand the elastic band 22 is reached.

The elastic band 22 is designed to expand when pressure in the inflation chamber 18 exceeds the threshold pressure. Threshold pressure may be empirically calculated. The elastic band 22 expands radially outwardly relative to the passageway 52 when the pressure in the inflation chamber 18 exceeds the threshold pressure. In the example shown in the Figures, the passageway 52 extends along an axis, and the elastic band 22 expands radially outwardly relative to the axis of the passageway 52 when pressure in the inflation chamber 18 exceeds the threshold pressure.

The elastic band 22 is elastically deformable relative to the tubular vent 20. When pressure exceeds the threshold pressure, the elastic band 22 elastically stretches to expand the passageway 52. When the tubular vent 20 is constricted by the elastic band 22, the material of the tubular vent 20 may be folded, crumpled, etc. by the elastic band 22. In such an example, when pressure in the inflation chamber 18, e.g., the second inflation chamber 46 in the example shown in the Figures, the elastic band 22 is elastically stretched and the material of the tubular vent 20 unfolds, uncrumples, etc. In examples in which the elastic band 22 is elastically deformable relative to the tubular vent 20, the material of the tubular vent 20 does not expand by elastically or plastically stretching the material of the tubular vent 20 as the elastic band 22 expands.

Since the elastic band 22 elastically deforms when pressure in the inflation chamber 18, e.g., the second inflation chamber 46 in the example in the Figures, exceeds the threshold pressure, the elastic band 22 expands as pressure in the second inflation chamber 46 increases above the threshold pressure and contracts as pressure in the second inflation chamber 46 decreases back toward the threshold pressure. In such an event, the amount of expansion of the elastic band 22 is based on the pressure in the inflation chamber 18, e.g. the second inflation chamber 46. In other words, the amount of expansion is variable based on pressure of the second inflation chamber 46. The elastic band 22 continues to expand as pressure in the inflation chamber 18 increases above the threshold pressure, and the elastic band 22 contracts as pressure in the inflation chamber 18 decreases toward the threshold pressure. The tubular vent 20 can open to a maximum position, as shown in the examples in FIGS. 5B and 6B. In those examples, the size and the shape of the tubular vent 20 is open such that the passageway 52 has reached the maximum size without plastic deformation or destruction of the tubular vent 20. The elastic band 22 may elastically expand to any size between the sizes shown in FIGS. 5A, 6A and FIGS. 5B, 6B based on pressure of the second inflation chamber 46.

The elastic band 22 may be an elastomer, i.e. an elastomeric material. As an example, the elastic band 22 may be rubber. In other examples, the elastic band 22 may be of any suitable material that elastically deforms when the inflation chamber 18 is inflated above the threshold pressure, e.g., between the sizes shown in FIGS. 5A, 6A and FIGS. 5B, 6B.

Each vent assembly 34 has a discharge rate. The discharge rate is the rate at which fluid flows from the inflation chamber 18, e.g., the second inflation chamber 46, through the tubular vent 20 to atmosphere. The discharge rate may be constant at pressure in the inflation chamber 18 lower than the threshold pressure. In some examples, the discharge rate may be above zero, and in other examples, the discharge rate may be zero when the pressure in the inflation chamber 18 is below the threshold pressure. The discharge rate of the vent assembly 34 varies as pressure in the inflation chamber 18 varies over the threshold pressure, e.g., as pressure in the second inflation chamber 46 varies in the example shown in the Figures. Specifically, after the threshold pressure has been reached and expansion of the elastic band 22 has initiated, the discharge rate of the vent assembly 34 increases as pressure in the inflation chamber 18 increases and further expands the elastic band 22.

Some of the vent assemblies 34 may have a discharge rate higher than the discharge rate of other vent assemblies 34 at pressures in the inflation chamber 18 that exceed the threshold pressure. In such an example, when pressure in the inflation chamber 18 exceeds the threshold pressure, one of the vent assemblies 34 vents the inflation chamber 18, e.g., the second inflation chamber 46 in the example shown in the Figures, at a higher rate than another of the vent assemblies 34.

The variation in discharge rate of various vent assemblies 34 at pressures above the threshold pressure can be used as design factors for positioning and movement of the airbag 14 during certain inflation and certain impacts. In the example shown in the Figures, the airbag 14 includes four vent assemblies 34. The inboard vent assembly 34, 54, i.e., the vent assembly 34 closest to the vehicle 10 centerline, has a higher discharge rate than the vent assembly 34, 56 on the outboard side of the airbag 14, i.e., the vent assembly 34 adjacent the door, at pressures in the inflation chamber 18 exceeding the threshold pressure so that the airbag 14 is stiffer at the outboard side of the airbag 14. In that example and/or in other examples, the vent assembly 34, 58 at the top of the airbag 14 may have a higher discharge rate than the vent assembly 34, 60 at the bottom of the airbag 14 at pressures in the inflation chamber 18 exceeding the threshold pressure so that the airbag 14 is stiffer at the bottom of the airbag 14. As an example, in the example in the Figures, the inboard vent assembly 34, 54 and the top vent assembly 58, 34 may both have higher discharge rates than the outboard vent assembly 34, 56 and the bottom vent assembly 34, 60 at pressures in the inflation chamber 18 exceeding the threshold pressure so that the airbag 14 is stiffer at the outboard side and the bottom side of the airbag 14.

The discharge rate of the vent assembly 34 at pressures in the inflation chamber 18 exceeding the threshold pressure can be based on, for example, the stiffness of the elastic band 22. The stiffness of the elastic band 22 is the resistance of the elastic band 22 to deform, i.e., an increase in stiffness increases the resistance to deformation and thus raises force to elastically deform the elastic band 22. Thus, an increase in stiffness of the elastic band 22 increases the necessary pressure in the inflation chamber 18 to expand the elastic band 22. In other words, the discharge rate at pressures in the inflation chamber 18 exceeding the threshold pressure is increased with an increase in the stiffness of the elastic band 22. The stiffness of the elastic band 22 is based on material type of the elastic band 22, thickness of the elastic band 22, width of the elastic band 22, position of the elastic band 22 along the tubular vent 20, etc. As another example in addition to or in the alternative to the properties of the elastic band 22, the discharge rate of the vent assembly 34 may be based on the maximum size of the passageway 52, the location of the vent assembly 34 on the panel 16, etc.

The airbag 14 may include other types of vents in addition to the vent assemblies 34 to control the pressure in the inflation chamber 18. The additional vents may be on the base segment 38 and/or the outer segment 40.

The vehicle 10 may include one or more impact sensors (not numbered) and a computer (not numbered) programmed to inflate the airbag 14 based on input from the impact sensors. The impact sensor is configured to detect certain vehicle 10 impacts. A "certain vehicle 10 impact" is an impact of the type and/or magnitude for which inflation of the first airbag 14 is designed i.e., "certain" indicates the type and/or magnitude of the impact. The type and/or magnitude of such "certain vehicle 10 impacts" may be pre-stored in the computer, e.g., which may be a restraints control module. The computer may actuate the inflator 24 to control inflation of the airbag 14 in response to detecting certain vehicle 10 impacts.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle airbag assembly comprising:
an airbag having a panel defining an inflation chamber inflatable to an inflated position;
the airbag including a tubular vent extending from the panel, the tubular vent being in fluid communication with the inflation chamber;
the airbag including an elastic band extending circumferentially around the tubular vent; and
the elastic band being elastically deformable relative to the tubular vent.

2. The vehicle airbag assembly as set forth in claim 1, wherein the tubular vent is fabric and the elastic band is an elastomer.

3. The vehicle airbag assembly as set forth in claim 1, wherein the elastic band is designed to expand when pressure in the inflation chamber exceeds a threshold pressure.

4. The vehicle airbag assembly as set forth in claim 1, wherein the tubular vent extends from the panel external to the inflation chamber and the elastic band is external to the inflation chamber.

5. The vehicle airbag assembly as set forth in claim 1, wherein the tubular vent is open to atmosphere.

6. The vehicle airbag assembly as set forth in claim 1, wherein the tubular vent is supported by the panel.

7. The vehicle airbag assembly as set forth in claim 1, wherein the tubular vent includes a passageway extending from the inflation chamber to atmosphere, the elastic band constricting the diameter of the passageway.

8. The vehicle airbag assembly as set forth in claim 1, further comprising an inflator, the inflation chamber being inflatable by the inflator to the inflated position.

9. The vehicle airbag assembly as set forth in claim 1, wherein the elastic band is sewn to the tubular vent.

10. The vehicle airbag assembly as set forth in claim 1, wherein the elastic band extends endlessly around the tubular vent.

11. The vehicle airbag assembly as set forth in claim 1, wherein the airbag includes a partition separating the airbag into a base segment and an outer segment and a one-way vent on the partition configured to allow fluid flow from the base segment to the outer segment and to prevent fluid flow from the outer segment to the base segment.

12. The vehicle airbag assembly as set forth in claim 11, wherein the outer segment is supported on the base segment and the tubular vent is on the outer segment.

13. The vehicle airbag assembly as set forth in claim 12, further comprising an inflator configured to inflate the outer segment through the base segment.

14. The vehicle airbag assembly as set forth in claim 1, wherein the elastic band is designed to constrict the tubular vent when pressure in the inflation chamber is below a threshold pressure, and the elastic band is designed to expand when pressure in the inflation chamber exceeds the threshold pressure.

15. The vehicle airbag assembly as set forth in claim 14, wherein the elastic band extends endlessly around the tubular vent.

16. A vehicle comprising:
a steering wheel;
a front pillar adjacent to the steering wheel; and
an airbag supported by the steering wheel;
the airbag having a panel defining an inflation chamber inflatable to an inflated position;
the airbag including a tubular vent extending from the panel, the tubular vent being in fluid communication with the inflation chamber;
the airbag including an elastic band extending circumferentially around the tubular vent; and
the elastic band being elastically deformable relative to the tubular vent.

17. The vehicle as set forth in claim 16, wherein the airbag includes:
a second tubular vent extending from the panel spaced from the tubular vent, the second tubular vent being in fluid communication with the inflation chamber;
the second tubular vent being inboard of the tubular vent; and
a second elastic band extending circumferentially around the second tubular vent.

18. The vehicle as set forth in claim 17, wherein the elastic band is designed to expand when pressure in the inflation chamber exceeds a threshold pressure, and the second tubular vent is designed to have a higher discharge rate than the tubular vent at pressures in the inflation chamber above the threshold pressure.

19. The vehicle as set forth in claim 18, wherein the elastic band is stiffer than the second elastic band.

* * * * *